T. J. MADIGAN.
HOSE COUPLING.
APPLICATION FILED SEPT. 25, 1916.
1,259,423.
Patented Mar. 12, 1918.
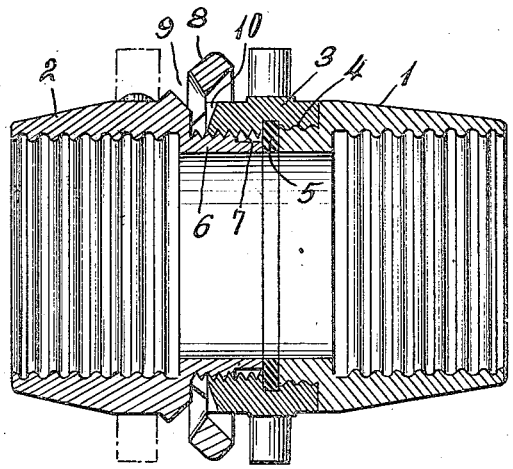
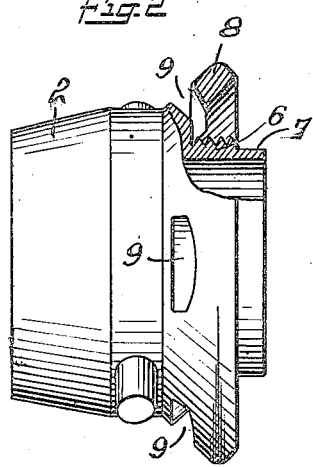
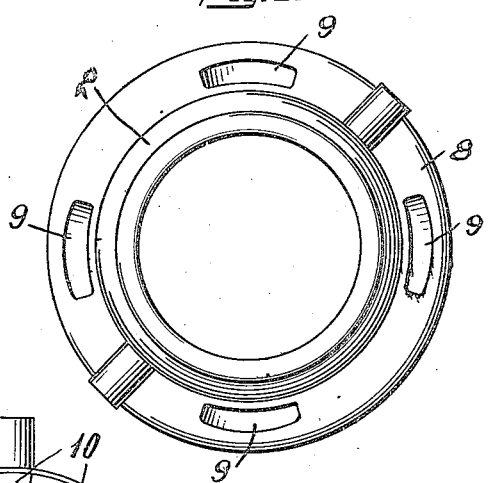
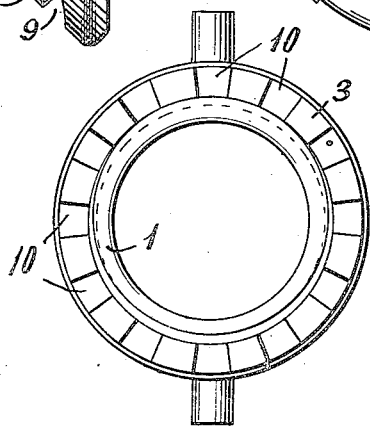
INVENTOR
Thomas J. Madigan
BY
ATTORNEYS

UNITED STATES PATENT OFFICE.

THOMAS J. MADIGAN, OF NEW YORK, N. Y., ASSIGNOR TO MADIGAN MANUFACTURING COMPANY, INC., OF NEW YORK, N. Y., A CORPORATION OF NEW YORK.

HOSE-COUPLING.

1,259,423.

Specification of Letters Patent.

Patented Mar. 12, 1918

Application filed September 25, 1916. Serial No. 121,941.

*To all whom it may concern:*

Be it known that I, THOMAS J. MADIGAN, a citizen of the United States, residing in the city, county, and State of New York, have invented certain new and useful Improvements in Hose-Couplings; and I do hereby declare the following to be a full, clear, and exact description of the invention, such as will enable others skilled in the art to which it appertains to make and use the same.

The present invention relates to couplings and is of a type well suited for use in connecting together lengths of hose, such, for instance, as fire hose.

It is an object of the present invention to provide a construction not easily injured when subjected to rough usage, and more particularly, to provide a construction in which all threaded members are inclosed, so that when the hose is roughly handled or dropped from a wagon to the pavement, the threads will not become deformed and liable to jam during subsequent use. This end is attained without rendering the coupling liable to clogging with ice, snow, sand or the like, under the trying conditions to which fire hose is often subjected.

It it another object of the invention to provide coupling members which can be connected together easily and quickly by one man, and with the certainty that the parts will come together in true alinement and with proper engagement of the threads at the start, and without danger of jamming the threads or stripping them in an effort to force the coupling members together when they are not in true alinement.

To accomplish the foregoing objects, and others which will hereinafter be made clear, or are inherent in the structure disclosed, the threaded nipple of the male member of the coupling is more or less inclosed in a sleeve. This sleeve may be made integral with the male member and is spaced from the threaded nipple to form an annular recess into which the rotating collar of the female member may be received. Preferably, the front part of the threaded nipple is devoid of threads and of such a diameter that it will slide along the tops of the threads in the female member and so will guide the collar on the inside while the collar is being shoved into position preparatory to engagement with the threads on the nipple.

In the accompanying drawings, which illustrate the preferred embodiment of the present invention, Figure 1 is a sectional elevation of the elements in coupled relation;

Fig. 2 is an elevation of the male member with parts broken away to show the threaded nipple and the inclosing sleeve;

Fig. 3 is an end elevation of said male member; and

Fig. 4 is an end elevation of the female member showing notches or recesses in the rotatable collar.

In the embodiment illustrated, the coupling comprises socket members 1 and 2 into which the ends of lengths of fire hose may be connected in suitable manner. Mounted on socket member 1 and forming with it the female member of the coupling, is a threaded collar 3. This collar is free to turn on socket member 1 but cannot be removed therefrom by axial movement. To effect this result, the collar 3 is provided with annular grooves 4 which initially are of somewhat larger diameter than the corresponding corrugations at the end of socket member 1, and after collar 3 has been slipped or driven into place, socket member 1 is expanded by means of a mandrel under hydraulic pressure, or in other suitable way, until the desired engagement between the corrugations at 4 is secured. Seated against the front end of socket member 1, and preferably retained in a recess in collar 3, is a rubber gasket 5 used for insuring a water-tight joint.

The male member of the coupling comprises a threaded nipple 6 adapted to seat on gasket 5. This may have near its front end a portion 7 free from threads and adapted to serve as a guide by sliding along over the tops of the threads in collar 3 when the parts are being brought together. Outside of this threaded nipple, and spaced therefrom to form an annular flaring recess, is a relatively thick sleeve 8 preferably formed integral with the socket member 2, and extending out far enough to afford protection for the threads on the male member when that member is disconnected and is being roughly handled. Male members constructed as above described have the advantage that they can be used with female members of standard construction without any alteration therein, and the comparative openness of the annular space within sleeve 8 tends to prevent the accumulation therein of sand, ice, snow or the like, which might accumulate therein under the trying conditions of service and prevent the free entrance of collar 3.

In order that foreign material may not become packed within the flaring recess about nipple 6 under any conditions of service, the sleeve 8 is provided with one or more vents or openings 9 through which such material pushed forward by a rotative movement of collar 3 may escape through the sleeve and out of the flaring annular recess. To facilitate the discharge of such foreign material from the recess, the front edge of collar 3 may be provided with a plurality of notches 10, the tendency of which is to pulverize and break up the foreign material and swing it around to the nearest opening 9 for discharge therethrough.

With a hose coupling of this construction, a single operator can bring the two members together into true alinement and can then rotate collar 3 to screw it up on the thread of nipple 6, and there will be no stripping of threads or loss of time due to faulty alinement, for before the threads of the collar can come into engagement with the threads on the nipple, the two parts will have been guided into true alinement by the sliding of the smooth part 7 of the nipple over the tops of the threads within the collar. The construction gives a sound connection with the rubber gasket, sealing the joint between collar 3 and nipple 6, and also between collar 3 and its socket member 1, and when the parts are disconnected, the sleeve 8 serves as a shield or guard to protect the threads on nipple 6 so that the fire hose can be roughly handled without danger of deforming the threads of the nipple or otherwise interfering with subsequent efficient operation.

It has sometimes happened that with fire hose laid across a street, the couplings have been crushed by the passage thereover of fire engines and other vehicles, and, as the distance between opposing wrench studs on the male and female members of the coupling is about equal to the thickness of a hose cart felly, that the wheel of the hose cart has become wedged between opposing wrench studs and picked up and tangled the hose. With applicant's construction, the collar on the male member extends outward almost as far as the wrench studs, and so prevents the entry therebetween of a vehicle wheel or the like. Also, this collar, because of its shape and its very considerable thickness, gives greater rigidity to the assembled coupling and greater resistance to crushing under conditions of accident.

I claim:—

1. In a hose coupling, the combination of a pair of socket members adapted for attachment to hose ends, one of said members being provided with a threaded portion and a sleeve spaced therefrom and having openings therethrough, the other of said members being provided with an interiorly threaded collar adapted to engage the threaded portion of the first named member and to force foreign material through said openings as said socket members are screwed together.

2. In a hose coupling, the combination of a pair of socket members adapted for attachment to hose ends, a collar rotatably mounted on one of said socket members, the other socket member being provided with threads for engagement with said collar and having a relatively thick sleeve extending obliquely therefrom to protect the threads from injury, said sleeve being provided with openings for the escape of foreign material pushed forward as said socket members are screwed together.

3. In a coupling, the combination of a pair of socket members adapted for attachment to hose ends, and a threaded collar mounted to turn on one of said members but incapable of axial movement thereover, said collar having notches in its front edge, the other socket member having a nipple with threads for engagement with the inside of said collar, the front end of said nipple being smooth to serve as a guide for said collar during the coupling operation, and a sleeve enveloping the threads on said nipple to protect them from mechanical injury while not in use, said sleeve being spaced from said threads to form a flaring annular recess into which said threaded collar may enter, said sleeve having openings through which foreign material pushed forward by said threaded collar may escape from said annular recess.

4. In a coupling, the combination of a pair of socket members adapted for attachment to hose ends, a collar mounted to turn on one of said socket members, wrench studs projecting from the collar, wrench studs projecting from the second socket member, said second socket member having a threaded nipple for engagement with said collar and having outside of said nipple a thick sleeve surrounding the same and extending outward approximately as far as do the wrench studs, said sleeve being provided with openings for the escape of foreign material pushed forward as the socket members are screwed together.

In testimony whereof I affix my signature.

THOMAS J. MADIGAN.